Figure 1:
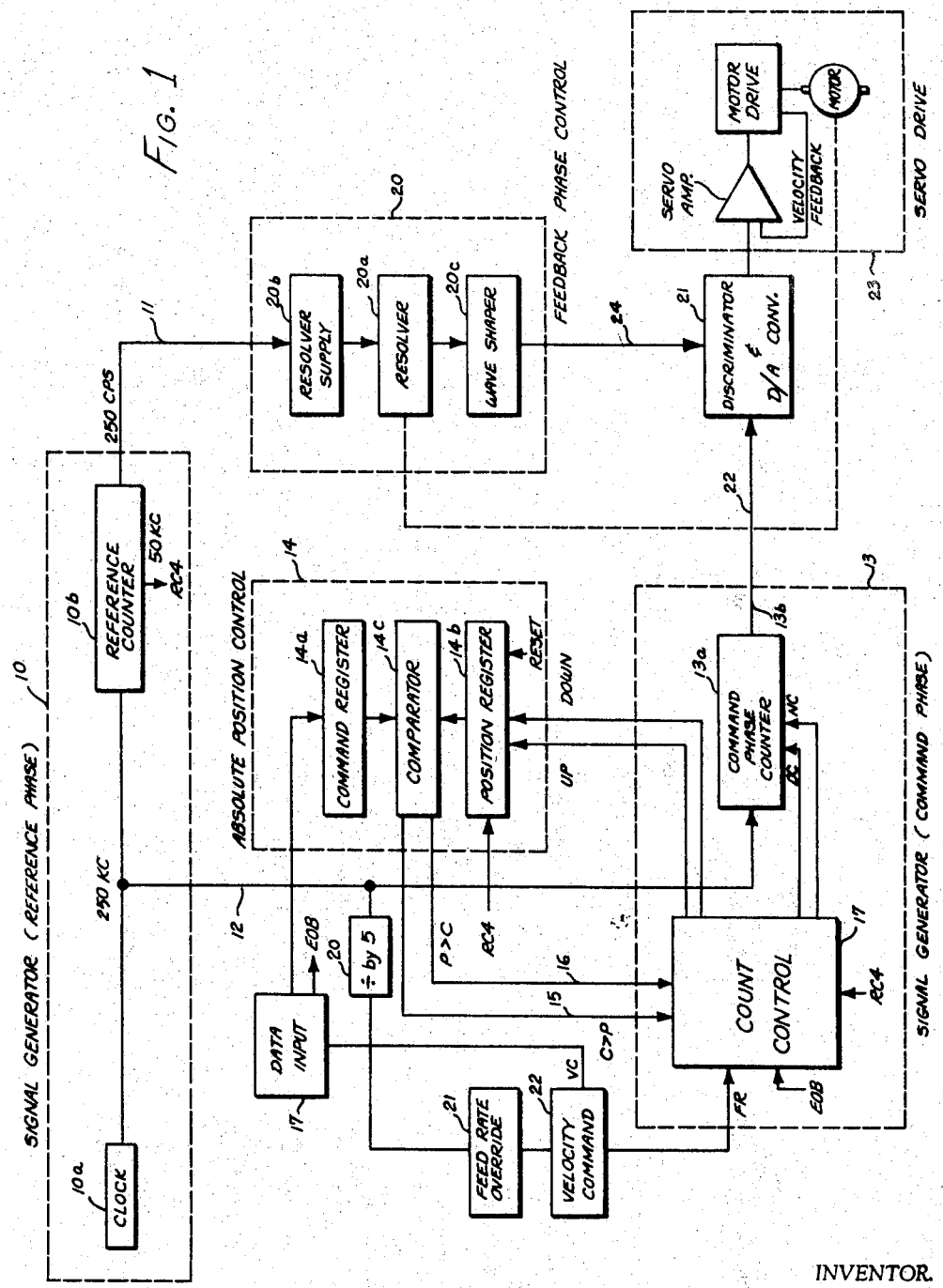

United States Patent Office 3,400,314
Patented Sept. 3, 1968

3,400,314
NUMERICAL POSITIONING CONTROL SYSTEM
William P. Wilson, Waynesboro, Va., assignor to General Electric Company, a corporation of New York
Filed May 27, 1965, Ser. No. 459,410
9 Claims. (Cl. 318—18)

This invention relates to automatic control systems, and more particularly to control systems for controlling the motion of a cutting element of a machine tool relative to a table carrying a workpiece.

In numerical positioning control systems, it is usually desirable to define the position of the tool with respect to the table in terms of absolute coordinates as distinguished from departure coordinates which are commonly utilized in numerical contouring control systems. A disclosure of a prior art numerical positioning control system using absolute coordinate programming is contained in an article in the May 1963 issue of Control Engineering entitled "Inside the Mark Century Numerical Controls." As may be seen by reference to this article, positioning control systems of this type which utilize absolute coordinates have heretofore required a plurality of resolvers in order to cover the entire range of tool travel. Commonly, they required three resolvers, three command phase counters, three wave shapers, two comparators, and a phase discriminator, and consequently such systems were found to be expensive due to the inherent parts duplication associated therewith.

In addition, there is no easy method of control in such systems over the tool feed rate when operating in the coarse and medium resolver ranges. Therefore, their is no convenient way for providing a plurality of feed rates which may be manually or automatically selected in accordance with the work being performed.

Furthermore, such systems do not readily adapt themselves to use with hydraulic systems which require the position loop to be closed at all times to keep the tool from drifting since this requires that the fine command phase counter and resolver be kept continuously running in order to maintain control over the tool. However, this is not possible with these prior are systems since such systems require that the command phase counter be initially stopped in order to read in the full phase shift command. Thus, the loop is open at this time, allowing the tool to drift from the position it has assumed.

Numerical positioning control systems having a full floating zero are highly desirable in those applications in which the program has been written with respect to a reference point on the part being machined. Provisions for a floating zero permit the operator to zero the machine with respect to the reference point on the part when an exact positional relationship between the part and the table is not easily established. The prior art technique for zeroing such positioning control systems required a plurality of manually actuated "zero offset" controls for presetting the command phase counters. This technique was cumbersome, complicated, and difficult for the operators to consistently perform with any degree of accuracy.

It is thus an object of this invention to provide a new and improved numerical positioning control system utilizing absolute coordinate programming and having only one position feedback transducer.

It is another object of this invention to provide a new and improved numerical positioning control system of the absolute coordinate type which has a controllable feed rate.

It is yet another object of this invention to provide a new and improved numerical positioning control system of the type utilizing absolute coordinates in which command signals can be read into command phase counters without opening the position control loop.

It is still a further object of this invention to provide a new and improved numerical control positioning system of the absolute coordinate type which may be very readily zeroed at any point by the operator without requiring the manual feeding of information into the command phase counter.

These and other objects and advantages of the invention will become apparent as this description proceeds with reference to the following description taken in connection with the accompanying drawings.

Figure 2:
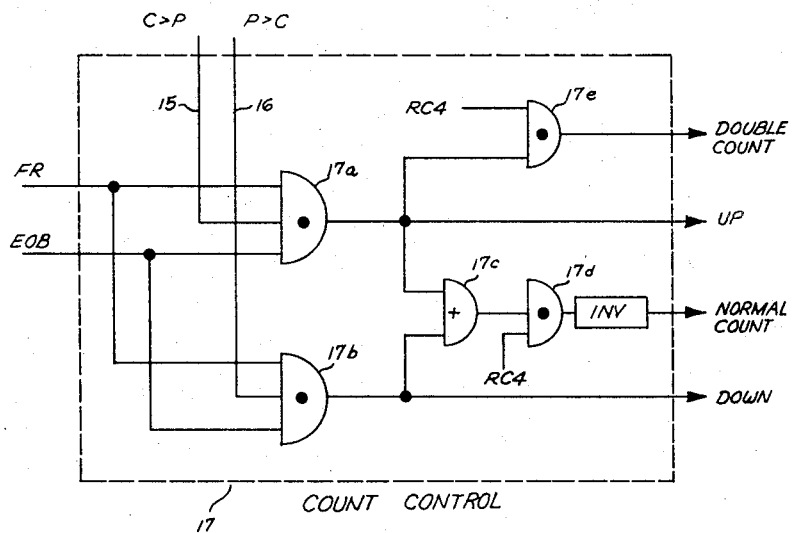
Figure 5:
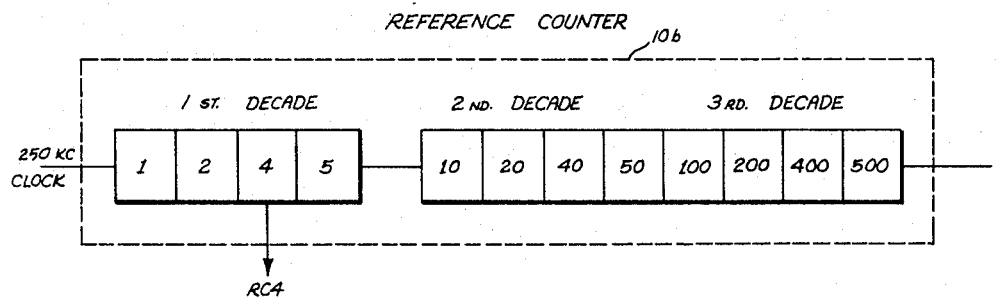
Figure 3:
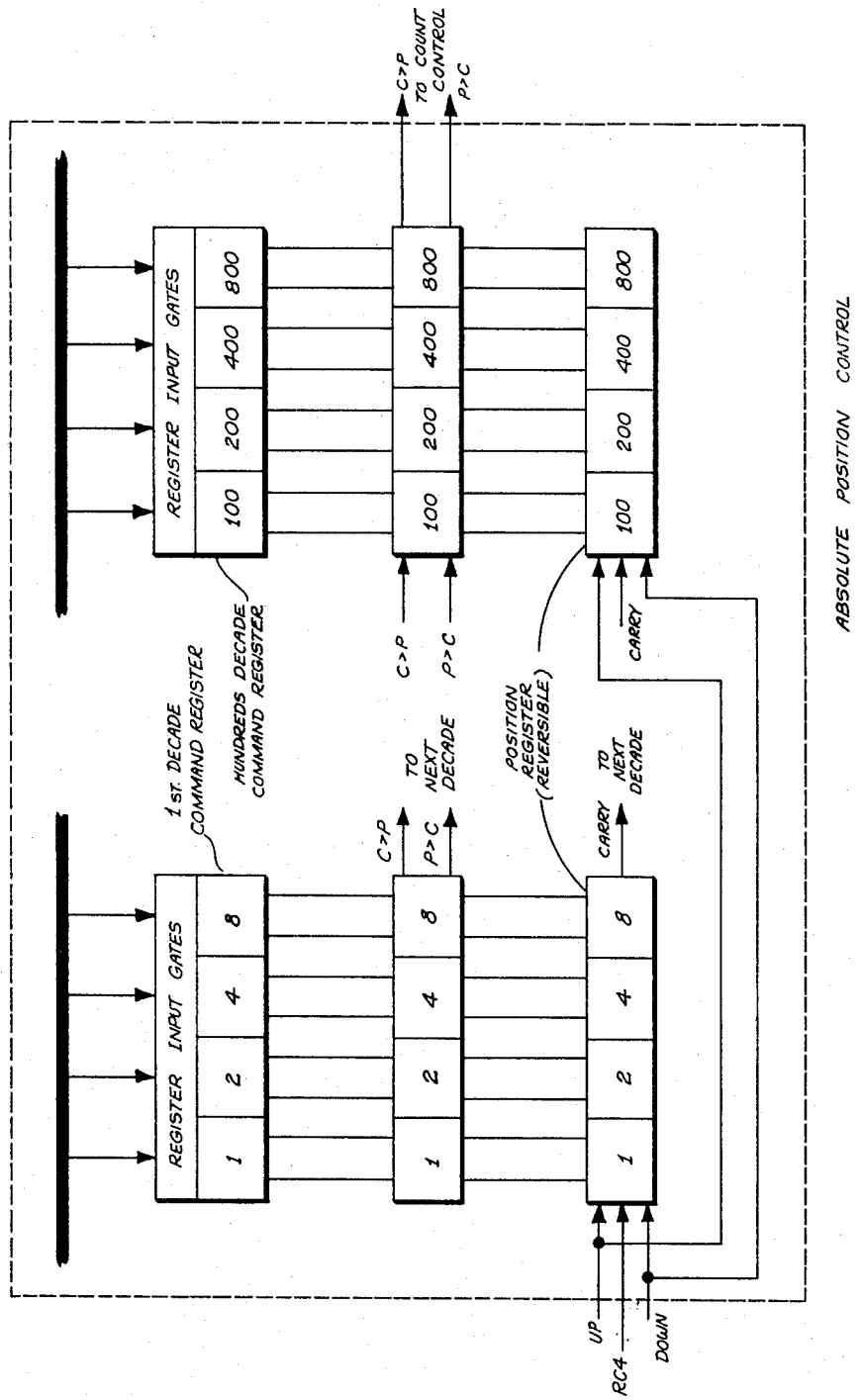
Figure 4:
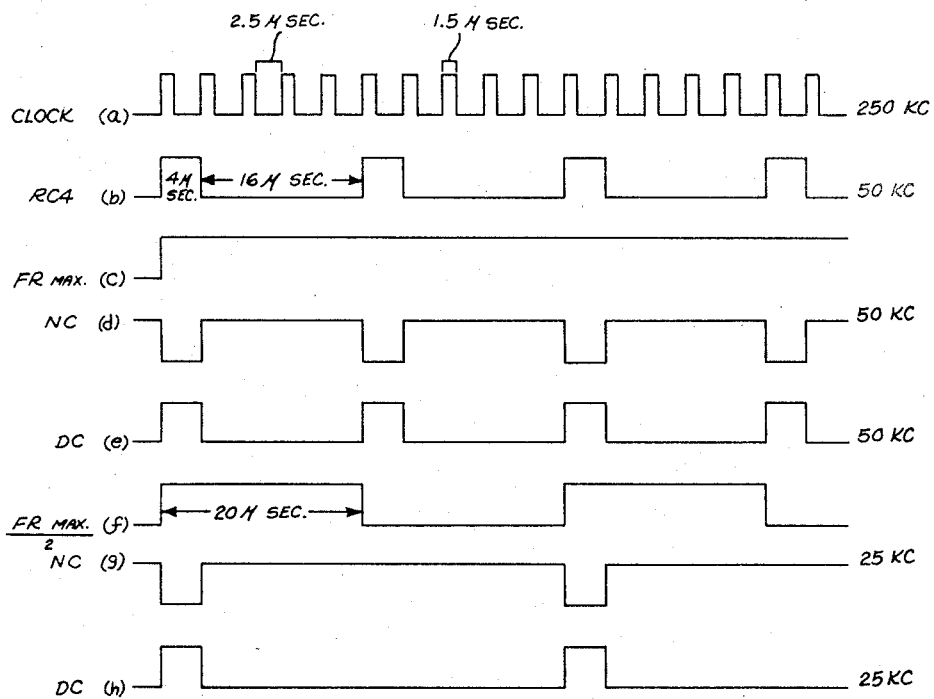

In the drawings:
FIG. 1 is a block diagram of a numerical positioning control system in accordance with the invention;
FIG. 2 is a schematic diagram of the COUNT CONTROL circuit of the system of FIG. 1;
FIG. 3 is a schematic representation of the ABSOLUTE POSITIONING CONTROL circuit of the system of FIG. 1;
FIG. 4 is a timing diagram of the waveforms useful in explaining the action of the COUNT CONTROL circuit; and
FIG. 5 is a schematic diagram of the REFERENCE COUNTER of the circuit of FIG. 1.

In accordance with the invention, I have provided a new and improved positioning control system using absolute dimension programming and incremental position feedback from a single feedback transducer, by controlling the frequency of a command phase counter of the type utilized in prior art contouring systems, in accordance with the results of a comparison operation between the commanded and the actual position of the tool under control.

To facilitate this discussion, reference may be had to U.S. Patent 3,173,001, issued Mar. 9, 1965 to J. T. Evans for Automatic Control Apparatus and assigned to the same assignee as this application. The description of the contouring system of this patent and that disclosed in the Control Engineering article are useful in this discussion due to the similarities between the positioning control system of my invention and these prior art contouring control systems.

The Evans patent will hereinafter be referred to for more detailed disclosures of the system components disclosed in the patent which may also be utilized in the system of my invention.

In accordance with the invention, position and feed rate commands of the control system are represented by the phase and rate of change of phase, respectively, of a signal applied to a servomechanism which is coupled to drive a machine tool. A feedback transducer observes the position of the machine tool as the machine tool responds to the command signals and generates a position phase signal whose phase relative to a reference is representative of the actual position of the machine tool. The phase of the command signal is compared with the phase of the position signal so that an error signal directly proportional to the phase difference between these two signals may be generated to energize the output servo drive. The magnitude of the error signal and its sense or polarity (determined by whether the phase of the command signal leads or lags that of the position signal) causes the machine tool to move in a direction such as would tend to reduce the magnitude of the error signal.

However, it will be appreciated that when the commanded position equals the actual position, the two signals applied to the comparison means are in phase. This results in a zero difference or error signal, and nothing happens. When the commanded position differs from the actual position, frequency control means are provided for continuously changing the phase of the command signal relative to the reference signal. Comparison of this phase modulated command signal with the continuously changing phase of the position feedback signal of the machine tool is used to produce a DC voltage proportional to the phase difference. This DC error voltage is then amplified and applied to a servo drive to cause the motor to move the tool in the direction of the commanded position.

It is another feature of this invention that the positioning control system may be zeroed very simply when the tool is at the reference position merely by resetting the position register to zero.

Referring now to FIG. 1, signal generator 10 which generates the reference phase signal is illustrated as comprising a CLOCK 10a which produces a stable square-wave signal at the rate of 250 kc. This signal is applied to REFERENCE COUNTER 10b which divides the 250 kc. clock signals by 1,000, thus producing a reference signal of 250 cycles per second on conductor 11. Reference to FIG. 5 will disclose that REFERENCE COUNTER 10b comprises a three decade counter which provides not only the required frequency division, but also provides a second reference signal RC4 which will hereinafter be discussed in more detail with respect to the timing diagrams of FIG. 4.

The 250 kc. clock signal is also applied over conductor 12 to the input of COMMAND PHASE COUNTER 13a of SIGNAL GENERATOR 13. COMMAND PHASE COUNTER 13a will produce a train of square pulses at the rate of 250 per second when the contents of COMMAND REGISTER 14a are equal to the contents of POSITION REGISTER 14b. When equality is sensed by COMPARATOR 14c, conductors 15 and 16 are at their zero level, and consequently the command phase signal on conductor 13b is in phase with the reference phase signal.

Referring now to FIG. 2, COMMAND PHASE COUNTER 13a will operate at the same frequency as REFERENCE COUNTER 10b when control signals are not present on conductors 15 and 16, i.e., they are at their zero level because COUNT CONTROL circuit 17 will not be operated when gates 17a and 17b remain unoperated. Under this condition, OR gate 17c will have its output at the zero level; consequently, AND gate 17d cannot be operated by RC4. Thus, the normal count signal NC will be at its one level and COMMAND PHASE COUNTER 13a will, assuming that it started counting in synchronism with reference counter 10b, provide a pulse train on output 13b which is in phase with the reference signal on conductor 11. In other words, the COMMAND PHASE COUNTER will count the clock signal in a normal manner, i.e., it will count each clock pulse.

The details of command phase counter 13a are not illustrated since they form no part of the invention and are old and well known in the prior art. For example, reference may be had to the previously mentioned Evans patent, FIG. 23, for a complete disclosure of a circuit which may be utilized for command phase counter 13a. In connecting the counter of FIG. 23 of the Evans patent into the system of the invention, the NC control signal should be applied to conductor 777 while the DC control signal should be applied to conductor 778.

Assuming now that feed rate signal FR is in its one condition at all times (see FIG. 4, waveform (c)) and assuming further that end of block signal EOB is in its one condition to indicate that the command signal emanating from DATA INPUT source 17 has been stored in command register 14a, the states of AND gates 17a and 17b will be controlled by the presence or absence of control signals C>P and P>C respectively. Assuming now that conductor 15 is in its one condition to indicate that comparator 14c determined that the commanded position was greater than the actual position, gate 17a will operate so that its output assumes a one level enabling AND gate 17e, which applies reference signal RC4 o command phase counter 13a in the form of double count signal DC.

Referring now to FIG. 4, waveform (b), it may be seen that signal RC4 is a 50 kc. signal and provides one pulse for every fifth clock pulse. Each time the DC signal assumes a one level, the command phase counter will count by two since each DC pulse applied to the COMMAND PHASE COUNTER will steer the clock pulse occurring at that time to its second stage to register a count of two. This increases the average effective count input rate to the COMMAND PHASE COUNTER to 300 kc. when RC4 is a 50 kc. signal. It is noted that NC will be the same as RC4 inverted, however, the presence of DC will control the effective count input rate. Thus, double count operation will cause counter 13a to count faster than reference counter 10b thus causing the command phase signal to lead the reference phase signal and cause the servo drive to drive the tool in the direction of the commanded position.

Assuming now that the FR and EOB signals coincide with P>C control signal, AND gate 17b will operate causing NC to assume the form illustrated in waveform (d). When NC is at its zero level, clock pulses applied to the first stage of the command phase counter are blocked so as to prevent the counter from counting clock pulses occurring at that time. However, when NC returns to its one condition, the command phase counter will resume counting pulses in a normal manner. This will cause counter 13a to count slower than counter 10b thus resulting in a phase lag. When this condition obtains, the average effective count input rate will be 200 kc.

Referring now to FIG. 3, it may be seen that POSITION REGISTER 14b comprises a multidecade reversible counter with the direction of counting controlled by UP and DOWN control signals generated by COUNT CONTROL 17. It will be appreciated that when AND gate 17a detects coincidence of the signals on its input, its output will assume a one level thus generating the UP control signal which when applied to the decades of position register 14b will enable the counter to count upwardly in response to the application of RC4. Thus, when the command signal is greater than the position signals registered in register 14b, the UP signal will be generated to cause register 14b to count toward the commanded position in unison with the actual tool movement since a corresponding phase difference is generated by counter 13a. This phase difference will be translated into corresponding movement so that POSITION REGISTER 14b will always register actual tool position in terms of absolute coordinates. COUNT CONTROL circuit 17 will in like manner generate a DOWN signal as long as AND gate 17b remains operated so as to cause the register to count downwardly at the rate determined by signal RC4.

Up until this point in our discussion it has been assumed that a fixed feed rate has been called for by feed rate signal FR remaining in a one condition. This causes the maximum feed rate permitted by the frequency selected for RC4. It is an important feature of this invention that variable feed rate control is simply provided in a positioning control system by dividing the clock pulse signal in divider 20 and applying the resultant 50 kc. signal to the FEED RATE OVERRIDE circuit 21. This circuit provides means for manually overriding the velocity command signal VC generated by DATA INPUT source 17 and applied to VELOCITY COMMAND circuit 22.

Assuming now that the velocity command signal VC calls for a feed rate equal to 50% of the maximum feed rate, feed rate signal FR would then be ON, i.e., at its one level 50% of the time, and would take the form illustrated in FIG. 4, waveform (f). This would thus cause signals NC and DC to take the forms illustrated in waveforms (g) and (h). These signals are 25 kc. signals, thus resulting in the maximum frequency deviation of the signals at the output of counter 13a being ∓25 cycles per second from the nominal 250 cycle per second output. The manner in which the FEED RATE OVERRIDE and VELOCITY COMMAND circuits perform these functions is old and well known in the prior art as exemplified by the Evans patent which discloses a "pulse rate divider" and "velocity command" circuit which may be utilized in the system of FIG. 1 to perform these functions.

It will be realized that comparing the reference and command phase signals with regard to phase when the outputs differ in frequency results in a continuously changing phase difference depending upon the magnitude of the frequency difference. FEEDBACK PHASE CONTROL 20 is comprised of a feedback transducer or RESOLVER 20a which shifts the phase of the excitation voltage, i.e., the reference signal, an amount proportional to the distance traveled. The constant of proportionality in the commercial embodiment of this invention is 360 degrees phase shift for every 0.1 inch of movement. Reference may be had to the Evans patent for circuit details of a feedback phase control circuit which may be utilized. This circuit is identified in FIG. 1 as a "position feedback synchro resolver." It suffices here to say that RESOLVER SUPPLY 20b is connected to REFERENCE COUNTER 10b so that two sinusoidal 90-degree phase displaced 250 c.p.s. signals are provided to excite the resolver which contains two primary (stator) windings. This phase excitation produces a uniform magnetic field in the resolver which rotates at the same frequency as the frequency of the excitation voltage. When the shaft of the resolver is standing still, the output signal of the secondary winding, i.e., the rotor, is a single phase voltage with the dominant frequency the same as the excitation voltage. The phase of this output voltage is dependent on rotor position so that rotation of the resolver will cause the output signal to shift phase at the rate of 360 degrees per revolution. This sinusoidal waveform is then applied to WAVE SHAPER 20c to convert this waveform into a square-wave voltage of the same frequency and phase. The resultant position signal, which is phase shifted in accordance with position feedback information, is applied by conductor 24 to a combined DISCRIMINATOR AND DIGITAL-TO-ANALOG CONVERTER 21 which produces a DC error voltage, the magnitude of which is proportional to the phase difference of the signals applied to its input. This error voltage is applied to servo drive 23 to control tool feed rate and direction in accordance with the magnitude and the phase of the error signal generated by discriminator 21.

A complete sequence of operation will now be discussed to afford a complete understanding of the invention. Assuming that the tool is in the commanded position and the feedback transducer is at a null point which occurs every 0.1 inch along the machine axis, all three signals, the command phase signal on conductor 13b, the reference signal, and the position phase signal, are now in phase. This being the case, a zero error voltage appears at the output of discriminator 21 and the servo drive is thus not energized.

Assuming now that a dimensional command is read into COMMAND REGISTER 14a and assuming further that this commanded position is larger than the actual table position, COUNT CONTROL 17 will start modifying the number of pulses that enter COMMAND PHASE COUNTER 13a due to the appearance of a control signal on conductor 15. Since in this case the commanded position is larger than the tool position, double count steering will be produced in the COMMAND PHASE COUNTER upon the appearance of control signal DC. Thus, the command phase output signal on conductor 13b will start to lead the phase of the reference signal on conductor 11. Since the table will not respond immediately, the phase shift introduced by RESOLVER 20a will be zero assuming it is at a null. Thus, the position phase signal on conductor 24 will be in phase with the reference phase signal on conductor 11. This means that the command phase signal will continue to advance with respect to the signal on conductor 24 until the table starts to move. The table will now accelerate until the feed rate speed is reached. The rate of this acceleration will be proportional to the rate at which the phase of the signals applied to a discriminator 21 move apart. However, as soon as the table starts to move, RESOLVER 20a starts to shift the phase of the reference signal in the same direction as that introduced by COMMAND PHASE COUNTER 13a. When the maximum feed rate speed is reached, the continuous change in phase introduced by COMMAND PHASE COUNTER 13a will be equal to that continuously introduced by RESOLVER 20a, thus resulting, when the system is at equilibrium, in a constant phase difference between the position phase signal and the command phase signal.

Since it is desirable to be able to operate the control with the position error larger than 0.1 inch, an extended range discriminator is utilized. Such a discriminator is described and claimed in the previously noted Evans patent. This type discriminator contains a reversible counter which counts up one count each time the phase of one input signal shifts through the 360-degree point as compared to the other input signal. In addition, the counter counts down one count every time the phase difference is decreasing when it goes through the 360-degree point. The extended range apparatus thus keeps track of each complete cycle of phase difference and superimposes, for each cycle, an analog control potential upon the potential developed from the discriminator which is commensurate with a phase difference less than 360 degrees. If the phase difference is lagging rather than leading, the analog potential is subtracted. In this way the total analog signal applied to the servosystem for actuating the machine tool is correctly directly proportional to the actual and tool phase difference between the command phase signal and the position phase signal.

While the principles of this invention have been described with respect to a specific embodiment, it will be obvious to those skilled in the art that other modifications could be made by those skilled in the art without departing in spirit and scope from the invention as defined by the appended claims. For example, it is clear that this invention is not limited to use in a control system in which the feedback transducer is interposed between the output of the reference counter and the input of the discriminator, but is equally applicable to a control system of the type in which the feedback transducer is excited from the command phase counter so as to be interposed between it and the discriminator. Even though this invention has been described with reference to a single axis positioning system, it will be apparent to those skilled in the art that it is equally applicable to multi-axis positioning control systems.

What I claim as new and desire to secure by Letters Patent of the United States is:

1. A control system for moving one object with respect to another object in accordance with a command signal comprising: a source of input data for providing said command signal, means for generating a reference signal of a given frequency, means for storing a signal representative of the actual position of said one object in terms of its absolute coordinate, means for comparing said position and command signals and generating a first control signal when said command signal represents a coordinate larger than the coordinate represented by said position signal, said comparing means generating a second control signal when said command signal represents a coordinate smaller than the coordinate represented by said position signal, means coupled to said comparing means for generating a second signal of the same frequency and phase as said reference signal, said second signal generating means being responsive to said first control signal for changing the frequency of said second signal to a value on one side of said given frequency, said second signal generating means being responsive to said second control signal for changing the frequency to a value on the other side of said given frequency, means coupled to said comparing means and responsive to said first and second control signals for changing the position signals stored in said position storing means so that they will continually register the position of said one object, phase control means responsive to incremental changes in position of said one object for changing the phase of an applied signal a proportional amount, phase discriminating means, means for coupling said reference signals and said second signals to said phase control means and said phase discriminator so that the phase shift introduced by said phase control means is of a direction tending to cancel the change in phase between said second signal and said reference signal which is caused by the shift of frequency of said second signal generating means, and means for driving said one object at a speed and in a direction proportional to the magnitude and polarity of the output signal of said phase discriminating means.

2. A control system for moving one object with respect to another object in accordance with a command signal comprising: a source of input data for providing said command signal, means for generating a reference signal of a given frequency, means for storing signals representative of the actual position of said one object in terms of its absolute coordinate, means for comparing said position and command signals and generating a first control signal when said command signal represents a coordinate larger than the coordinate represented by said position signal, said comparing means generating a second control signal when said command signal represents a coordinate smaller than the coordinate represented by said position signal, means for generating a second signal of said given frequency and being of the same phase as said reference signal, means coupled to said comparing means for controlling the frequency of said second signal in response to said first and second control signals to change the frequency of said second signal to first and second values, respectively, said first and second values being on opposite sides of said given frequency, said frequency controlling means also being responsive to said first and second control signals for changing the position signals stored in said position signal storing means so that said position signal continually represents the absolute coordinate of said one object, phase control means responsive to incremental changes in position of said one object for changing the phase of an applied signal a proportional amount, phase discriminating means, means for coupling said reference signals and said second signals to said phase control means and said phase discriminator so that the phase shift introduced by said phase control means is of a direction tending to cancel the change in phase between said second signal and said reference signal which is caused by the shift of frequency of said second signal generating means, and means for driving said one object at a speed and in a direction proportional to the magnitude and polarity of the output signal of said phase discriminating means.

3. The combination of claim 2 in which said data source provides a velocity command signal for controlling the traverse speed of said one object and means coupled to said reference signal source and responsive to said velocity command signal for generating a feed rate signal and applying it to said frequency controlling means to control the magnitude of the maximum change in frequency of said second signal.

4. The combination of claim 3 further comprising means coupled between said reference signal source and said feed rate generating means for manually overriding the velocity command signal so as to permit the operator to vary the feed rate signal called for by said source of input data.

5. A control system for moving one object with respect to another object in accordance with a command signal comprising: a source of clock signals, a source of input data for providing said command signal, means coupled to said clock source for dividing said clock signals to provide a reference signal of a given frequency, means for storing signals representative of the actual position of said one object in terms of its absolute coordinate, means for comparing said position and command signals and generating a first control signal when said command signal represents a coordinate larger than the coordinate represented by said position signal, said comparing means generating a second control signal when said command signal represents a coordinate smaller than the coordinate represented by said position signal, means synchronized from said clock source for generating a second signal of said given frequency and being of the same phase as said reference signal, means coupled to said reference signal source for generating a second reference signal having a frequency which is a submultiple of said clock signals, means coupled to said comparing means and said second reference signal source for controlling the frequency of said second signal by effectively increasing the drive frequency of said second signal generating means to a value proportional to the sum of the frequencies of said clock signals and said second reference signals in response to said first control signal to thus increase the frequency of said second signal, said frequency controlling means being responsive to said second control signal for effectively decreasing the drive frequency of said second signal generating means to a value proportional to the difference between the frequency of said clock signals and said second reference signals, means coupled to said comparing means for developing signals in response to said first and second control signals to modify the position signals stored in said position storing means so that said position signal continually represents the absolute coordinate of said one object, phase control means responsive to incremental changes in position of said one object for changing the phase of an applied signal a proportional amount, phase discriminating means, means for coupling said reference signals and said second signals to said phase control means and said phase discriminator so that the phase shift introduced by said phase control means is of a direction tending to cancel the change in phase between said second signal and said reference signal which is caused by the shift of frequency of said second signal generating means, and means for driving said one object at a speed and in a direction proportional to the magnitude and polarity of the output signal of said phase discriminating means.

6. The combination of claim 5 in which said data source provides a velocity command signal for controlling the speed of said one object, and means coupled to said clock signal source and responsive to said velocity command signal for generating a feed rate signal and applying it to said frequency controlling means to effectively control the frequency of said second reference signal as it is applied to said second signal generating means to thereby control the maximum shift in frequency of said second signal in accordance with said velocity command signal.

7. The combination of claim 6 further comprising means coupled between said clock source and said feed rate generating means for manually overriding the velocity command signal so as to permit the operator to vary the feed rate signal called for by said source of input data.

8. A control system for moving one object with respect to another object in accordance with a command signal comprising: a source of clock signals, a source of input data for providing said command signal, means coupled to said clock source for dividing said clock signals to provide a reference signal of a given frequency, means for storing signals representative of the actual position of said one object in terms of its absolute coordinate, means for comparing said position and command signals and generating a first control signal when said signal represents a coordinate larger than the coordinate represented by said position signal, said comparing means generating a second control signal when said command signal represents a coordinate smaller than the coordinate represented by said position signal, means synchronized from said clock source for generating a second signal of said given frequency and being of the same phase as said reference signal, means coupled to said reference signal source for generating a second reference signal having a frequency which is a submultiple of said clock signals, means for applying said second reference signal to trigger said storing means to cause it to respond when enabled, at the frequency of said second reference signal, means coupled to said comparing means and said second reference signal source for controlling the frequency of said second signal by effectively increasing the drive frequency of said second signal generating means to a value proportional to the sum of the frequencies of said clock signals and said second reference signals in response to said first control signal to thus increase the frequency of said second signal, said frequency controlling means being responsive to said second control signal for effectively decreasing the drive frequency of said second signal generating means to a value proportional to the difference between the frequency of said clock signals and said second reference signals, means coupled to said storing means for developing signals in response to said control signals for enabling said storing means so that said position signal continually represents the absolute coordinate of said one object, phase control means responsive to incremental changes in position of said one object for changing the phase of an applied signal a proportional amount, phase discriminating means, means for coupling said reference signals and said second signals to said phase control means and said phase discriminator so that the phase shift introduced by said phase control means is of a direction tending to cancel the change in phase between said second signal and said reference signal which is caused by the shift of frequency of said second signal generating means, and means for driving said one object at a speed and in a direction proportional to the magnitude and polarity of the output signal of said phase discriminating means.

9. The combination of claim 8 in which said data source provides a velocity command signal for controlling the speed of said one object, means coupled to said clock signal source and responsive to said velocity command signal for generating a feed rate signal and applying it to said frequency controlling means, the time duration of said feed rate signal effectively controlling the frequency of said second reference signal as it is applied to said second signal generating means, said enabling means comprising means coupled to said comparing means for generating a third control signal to enable said storing means to count upward when said first control signal and said feed rate signal coincide, said enabling means further comprising means coupled to said comparing means for generating a fourth control signal for enabling said storing means to count downward when said second control signal and said feed rate signal coincide.

References Cited

UNITED STATES PATENTS 3,173,001   3/1965   Evans _____ 318—162 XR
3,327,101   6/1967   Evans _____ 318—28

BENJAMIN DOBECK, *Primary Examiner.*